(12) United States Patent
Prudham (10) Patent No.: US 7,304,450 B2
(45) Date of Patent: Dec. 4, 2007

(54) MOTOR-REDUCTION UNIT SWITCHED ON AN ABSOLUTE POSITION SIGNAL

(75) Inventor: Daniel Prudham, Thise (FR)

(73) Assignee: Moving Magnet Technologies, Besancon (FR)

( * ) Notice: Subject to any disclaimer, the term of this patent is extended or adjusted under 35 U.S.C. 154(b) by 357 days.

(21) Appl. No.: 10/381,739

(22) PCT Filed: Oct. 5, 2001

(86) PCT No.: PCT/FR01/03081

§ 371 (c)(1),
(2), (4) Date: Apr. 4, 2003

(87) PCT Pub. No.: WO02/29959

PCT Pub. Date: Apr. 11, 2002

(65) Prior Publication Data

US 2004/0085041 A1    May 6, 2004

(30) Foreign Application Priority Data

Oct. 6, 2000    (FR) .................................. 00 12829

(51) Int. Cl.
*H02P 1/46* (2006.01)
*H02P 3/18* (2006.01)

(52) U.S. Cl. ...................... 318/721; 318/138; 318/439; 318/254; 318/700

(58) Field of Classification Search ................... 318/15, 318/9, 439, 560, 600, 601, 615, 652, 653, 318/654, 655, 656, 661, 665, 138, 254, 700–800
See application file for complete search history.

(56) References Cited

U.S. PATENT DOCUMENTS

| | | | | |
|---|---|---|---|---|
| 4,692,674 A * | 9/1987 | Packard et al. | ............. | 318/254 |
| 5,334,898 A * | 8/1994 | Skybyk | ...................... | 310/268 |
| 5,452,697 A * | 9/1995 | Sasaki et al. | ............... | 123/399 |
| 5,686,804 A * | 11/1997 | Siraky | ......................... | 318/640 |
| 5,818,178 A * | 10/1998 | Marumoto et al. | ......... | 318/254 |
| 5,828,193 A * | 10/1998 | Furuta | ........................ | 318/254 |
| 5,847,530 A * | 12/1998 | Hill | ............................ | 318/599 |
| 5,852,996 A * | 12/1998 | Nakamura et al. | .......... | 123/399 |
| 5,992,383 A * | 11/1999 | Scholten et al. | ............ | 123/399 |

(Continued)

FOREIGN PATENT DOCUMENTS

| | | |
|---|---|---|
| EP | 0 414 941 | 3/1991 |
| EP | 0 856 939 | 8/1998 |
| EP | 1 028 239 | 8/2000 |
| JP | 01 248010 | 10/1989 |
| JP | 09 322584 | 12/1997 |

*Primary Examiner*—Lincoln Donovan
*Assistant Examiner*—Tyrone Smith
(74) *Attorney, Agent, or Firm*—Oblon, Spivak, McClelland, Maier & Neustadt, P.C.

(57) ABSTRACT

An electric actuator including at least a first P-phase automatically-switched brushless synchronous motor, P being an integer ranging between 1 and 6, and N pairs of poles at the rotor, N being an integer not less than 1. The actuator also includes a position sensor outputting signal to control an electronic circuit controlling the motor. The rotor of the motor drives a gear ratio reducing mechanism. The position sensor is coupled to the reduction unit output shaft to measure the absolute angular position of the reduction unit output shaft. The electronic circuit includes a circuit sequentially controlling the current of each of the phases producing automatic switching of powering sequences of the phases on the basis of the absolute position of the reduction unit output shaft.

13 Claims, 12 Drawing Sheets

U.S. PATENT DOCUMENTS

| | | |
|---|---|---|
| 6,194,856 B1 * | 2/2001 | Kobayashi et al. ......... 318/432 |
| 6,198,275 B1 | 3/2001 | Wolf et al. |
| 6,398,330 B1 * | 6/2002 | Chua et al. .................... 347/8 |
| 6,465,974 B2 * | 10/2002 | Watanabe ................... 318/254 |
| 6,686,713 B2 * | 2/2004 | Desbiolles et al. ......... 318/254 |
| 6,967,453 B2 * | 11/2005 | Miettinen ................... 318/471 |
| 2002/0100156 A1 * | 8/2002 | Speller et al. ........... 29/407.09 |

* cited by examiner

Fig.1

Prior Art

MOTOR-REDUCTION UNIT SWITCHED ON AN ABSOLUTE POSITION SIGNAL

BACKGROUND OF THE INVENTION

The present invention relates to the art of actuators of the motorized reducing-gear type, comprising an electric motor coupled to a speed-reduction mechanism.

By actuator there is understood a means for causing rotary movement of an operating element through a travel of less than 360°. The function of an actuator is to ensure precise and repeatable angular positioning under the control of an operating circuit. It differs from a motor, the function of which is to cause an operating element to turn at a given rate of rotation, in the form of n revolutions per minute, without angular limit.

In the prior art there are known numerous motorized reducing gears used in the automobile sector of valves for control of air flow, gas recirculation or air-conditioning. These valves are usually composed of a d.c. motor with brushes, one or two mechanical reduction stages and a potentiometer for indicating the position of the output shaft. Descriptions of such motorized assemblies can be found in U.S. Pat. No. 5,672,818 or in European Patent 1009089.

The disadvantage of these devices is that they use a commutator motor, the useful life of which is limited in applications exposed to demanding temperature and vibration conditions. Similarly, the potentiometers used heretofore have a limited useful life because of the presence of brushes.

From the prior art there is also known Japanese Patent 09322584, which describes a motor and not an actuator. This motor is provided with a speed-reducing gear that drives a relative and not absolute position transducer.

The transducer described in that prior art document delivers two sinusoidal signals having a phase difference of 90°. These are relative and not absolute position signals.

There is also known European Patent 0856939, which describes not a means for operating the motor from a signal delivered by an absolute position transducer, but an end-of-travel detector. It is provided with a motor-control circuit activated by a switching circuit, which in turn is operated by the position transducer, which delivers end-of-travel information.

Thus the manufacturers of this type of valve are all working toward the introduction of "brushless" motors, or in other words synchronous motors that are self-commutated by signals from encoders integrated in the motor, and toward the integration of contactless position transducers (of magnetic, inductive or capacitive type) to replace the brush-type devices.

Figure 1:
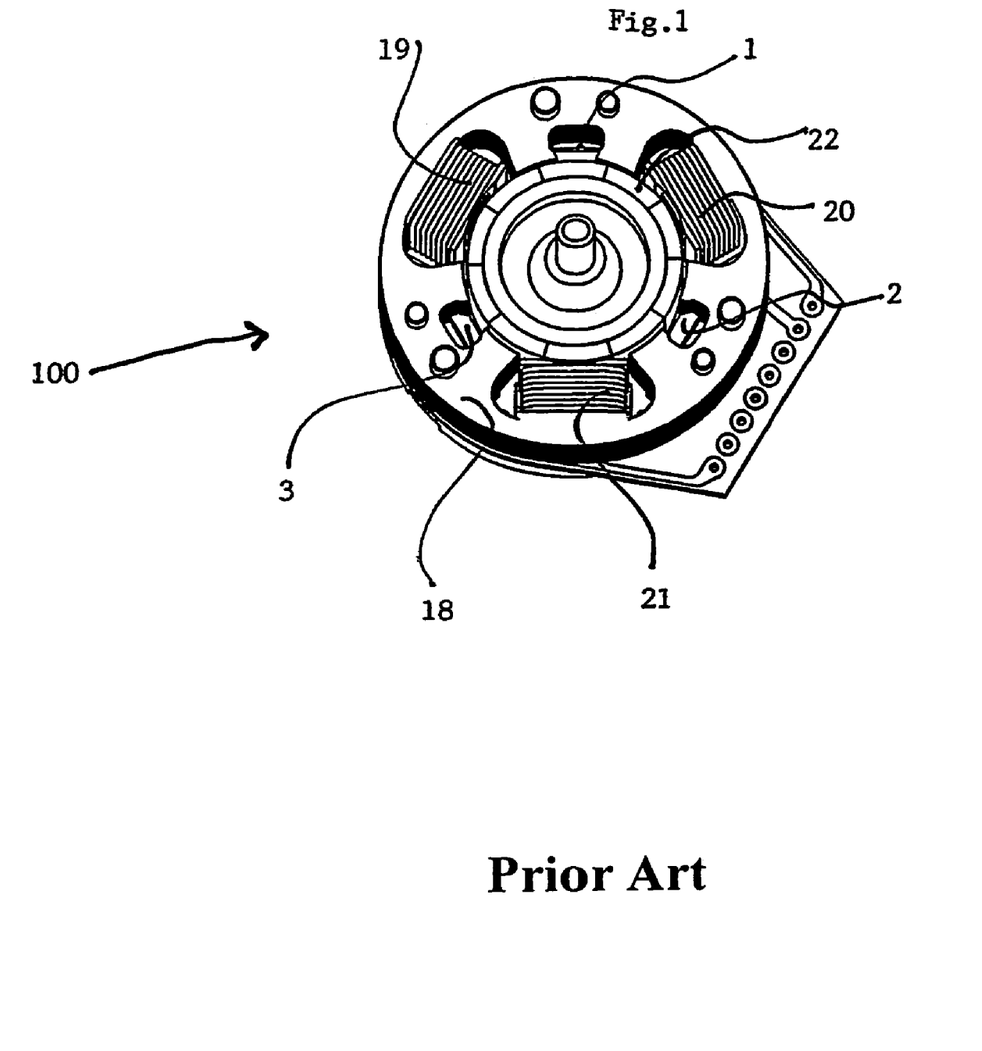
FIG. 1 illustrates a schematic view of a prior art actuator.
Figure 2:
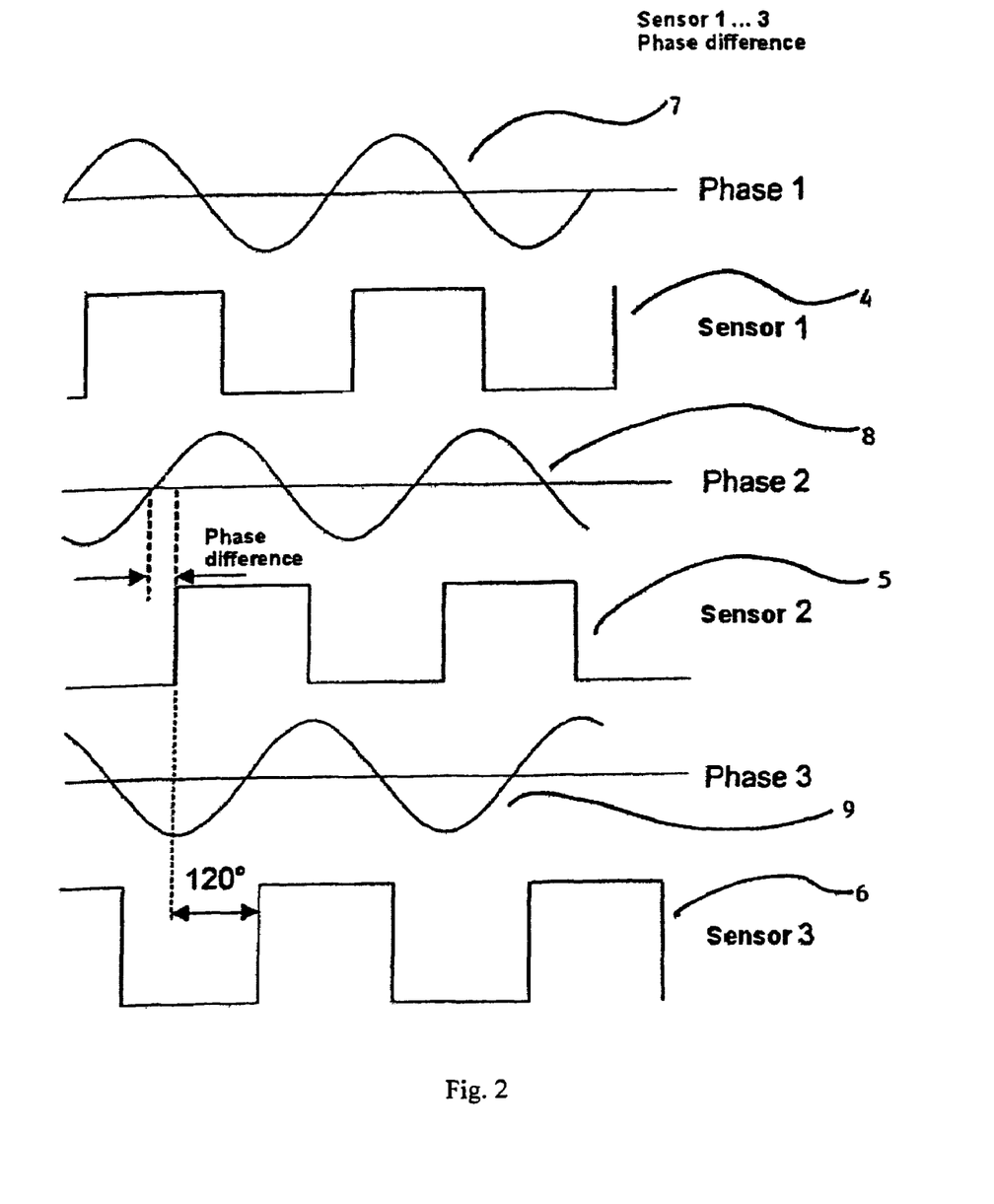
FIG. 2 illustrates the electrical signals corresponding to a prior art actuator.

Brushless d.c. motors of diverse polyphase types have been known in the prior art for many years, and a view of such a three-phase motor (100), described in U.S. Pat. No. 5,880,551 of the Applicant, can be seen in FIG. 1. This FIG. 1 shows the positions of three Hall-effect sensors ((1), (2), (3)), placed inside the toothing (18) for the purpose of delivering, as indicated in FIG. 2, three electrical signals ((4), (5), (6)) with a phase difference of 120 electrical degrees as well as the phase difference of these sensor signals relative to the coupling constants ((7), (8), (9)) of the three phases ((19), (20), (21)) of FIG. 1. The presence of these sensors in the stator part of the motor permits an appreciable space savings, wherein an ideal 120° phase is assured by the positioning between 2 teeth of 2 neighboring phases. The goal of the presence of these 3 sensors is to deliver to an operating electronic unit, referred to as "switching logic" in the text of this patent, information indicating the position of rotor (22) with 5 pairs of poles, shown in FIG. 1. As a function of such rotor-position information, the switching logic will send the necessary instructions to an electronic unit known as the "control logic" which, in the case of a three-phase motor, for example, operates the 6 transistors used (4 transistors for a two-phase motor). This operational mode, known as "self-commutation", makes it possible to achieve optimal adjustment of the current phase difference relative to the coupling constants of each phase (since it takes place automatically relative to the rotor position) and to minimize the torque fluctuation that would be subsequently detrimental to positioning servo control.

Such assemblies require an electronic control circuit that receives on the one hand an input signal originating from the transducer for indicating the angular position of the output shaft and on the other hand the input signals originating from each of the Hall sensors.

Figure 3:
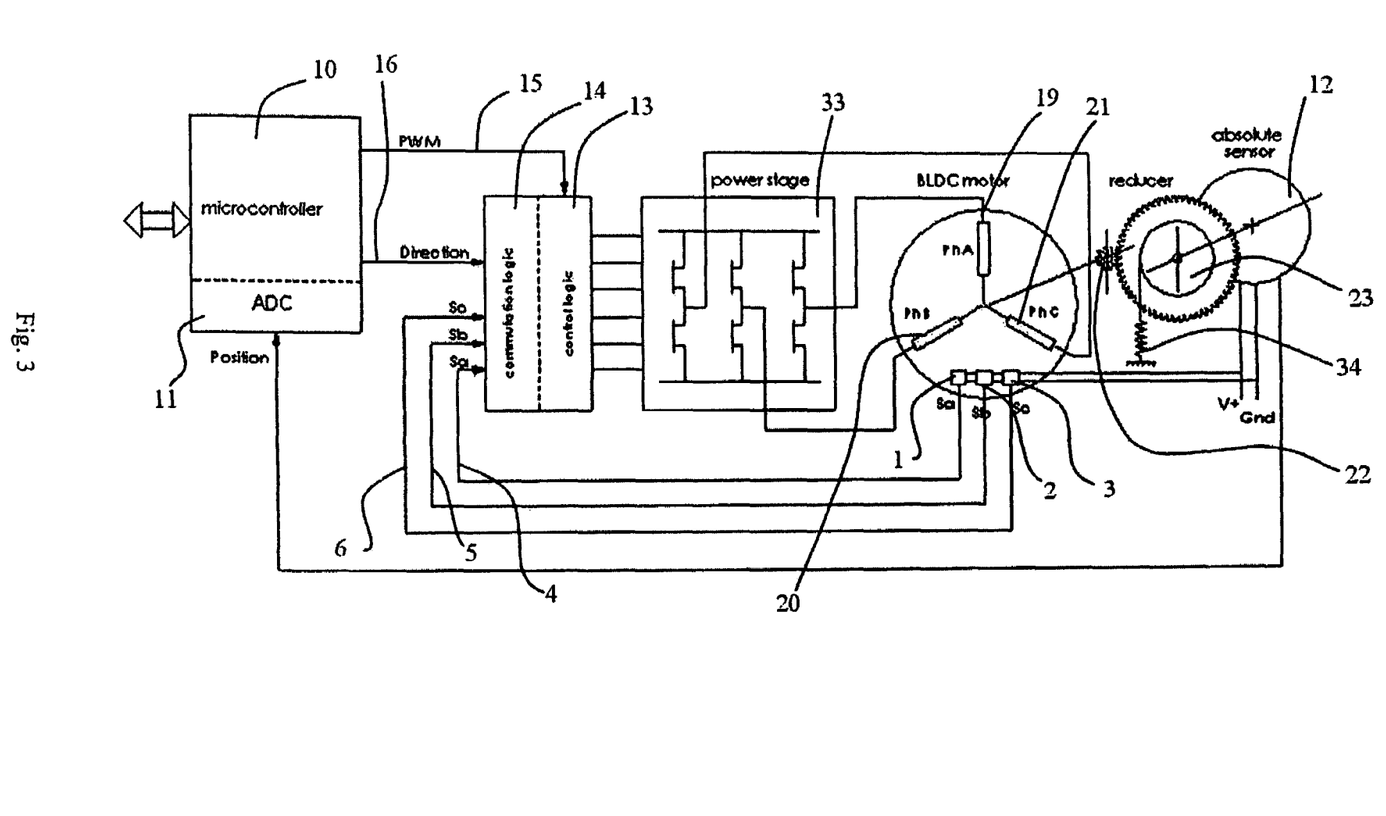
FIGS. 3 and 4 illustrate a view of the control circuit of a prior art actuator.

FIG. 3 shows a general diagram of the control electronics of a brushless motorized reducing gear integrated in a valve-control application known from the prior art: by means of a PWM (pulse width modulated) signal (15) and an operating-direction signal (16), the control logic (13) will therefore have to process the information originating from the microcontroller (10), responsible for managing positioning servo control by virtue of an analog-to-digital converter (11) that acquires the signal of the output potentiometer (12), and the information originating from the switching logic (14), which delivers information relating to the position of the rotor (22). The control logic (13) will operate the power stage (33) responsible for imposing the current in each phase ((19), (20), (21)) and for driving the rotor (22), engaged with the input pinion of the speed-reducing gear (23), which drives the output shaft, on which there is mounted the absolute position transducer (24). What must therefore be imagined are two interconnected servo control loops:

a) a positioning servo control loop in which the microcontroller will on the one hand modulate, by means of the PWM signal acting on the control logic and therefore on the transistors (33), the level of the current passing through the motor phases, and will on the other hand define, by means of the direction signal acting on the switching logic (14), the direction of rotation of the motor. This positioning servo control loop is of a type identical to that of a servo control loop for d.c. motors.

b) A self-commutation loop, which will act on the control logic (13) by means of the switching logic (14), and will permit supply to the phases in a sequence that is a function of the state of the signals of sensors SA, SB, SC ((4), (5), (6)).

Figure 4:
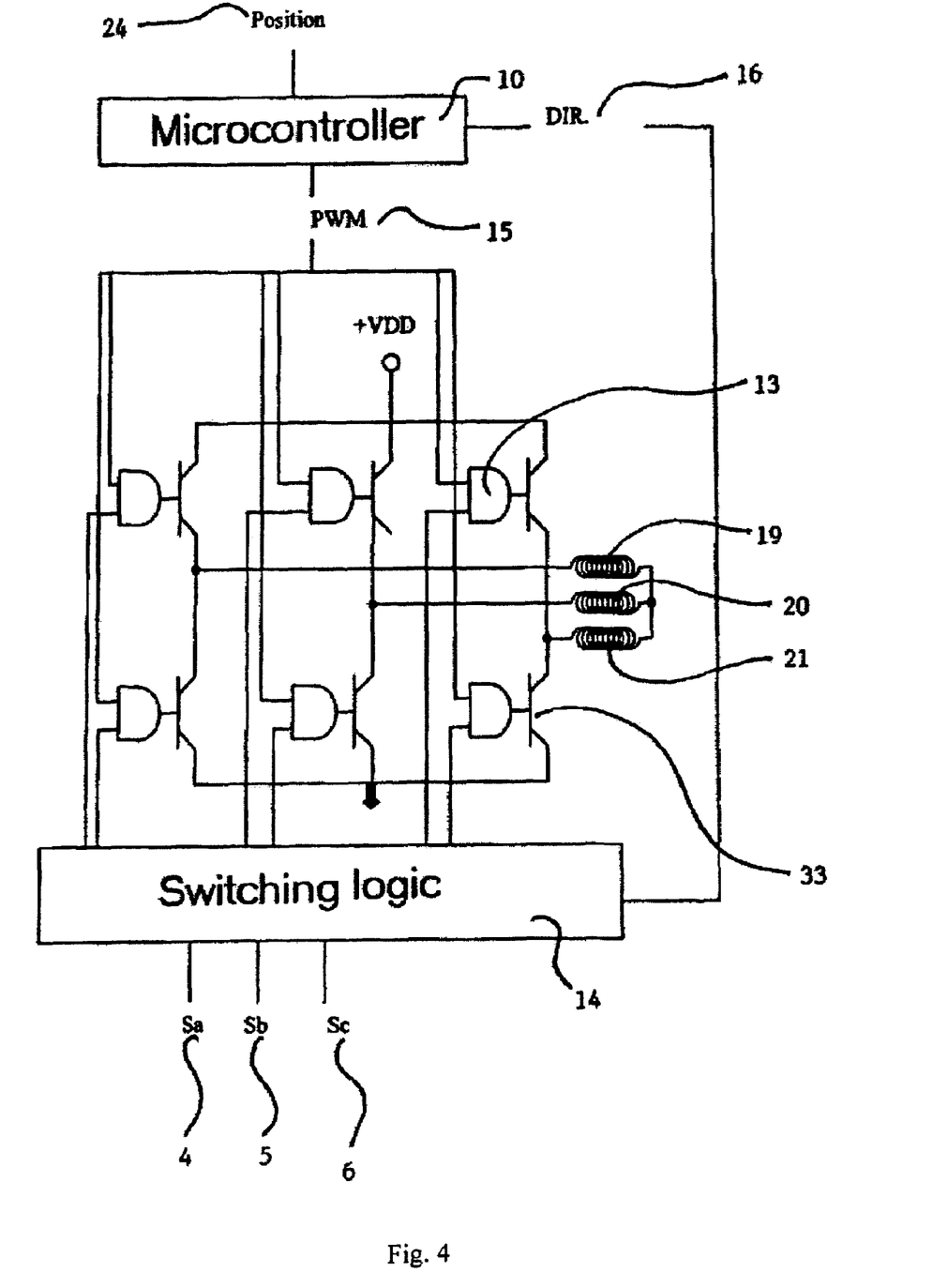

The detail of how these two loops are interconnected is shown in FIG. 4, where the control logic is represented by ET logic gates operating the 6 transistors.

The disadvantage of these prior art devices, self-commutated by 3 sensors, is the large number of conductors necessary. Each of these sensors has 3 connecting conductors (+5 V, ground and signal), the three-phase motor has at least 3 connecting conductors, and the redundant potentiometer may have 4 conductors (+5 V, ground and 2 outputs). Applications with the three-phase brushless d.c. motor of FIG. 1 may therefore be connected by 10 conductors (+5 V, ground, 3 sensor signals, 3 motor connection conductors, 2 redundant potentiometer signals), whereas the same application with brush-type d.c. motor as described in U.S. Pat. No. 5,672,818 of Bosch will have only 6 conductors.

The goal of the present invention is to avoid the disadvantages both of actuators with brush-type motors and of actuators with brushless motors, by proposing an actuator provided with a brushless motor that requires only a reduced number of wiring conductors.

BRIEF SUMMARY OF THE INVENTION

Figure 5:
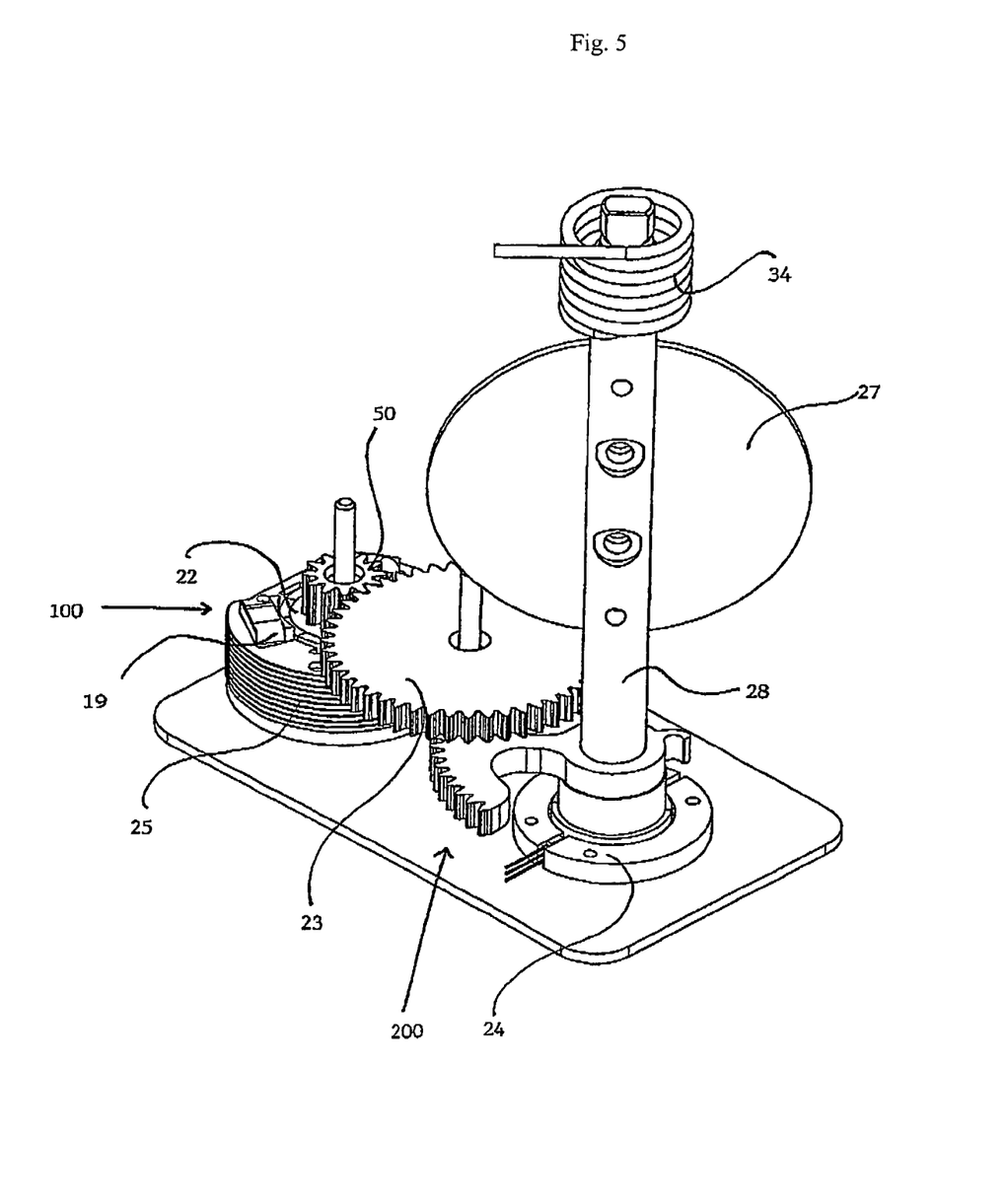
FIG. 5 illustrates a schematic view of an actuator according to the invention.

The present invention relates to electric actuators composed of at least:
- a polyphase brushless synchronous motor (100) having P phases and N pairs of poles on the rotor (22)
- a mechanical speed-reducing gear (23) with 1/R gear ratio and angular play j
- a restoring spring (34) for return to a reference position designated $\theta_0$ on the output shaft (28)
- an absolute position transducer (24) that delivers position information expressed in mV/°, or in the case of PWM outputs that can be treated in mV/°, of resolution r expressed in degrees.

and it is particularly suitable for control of limited-travel valves in the automobile sector. FIG. 5 shows a descriptive diagram of the typical application for an air-admission throttle valve (27).

Such an actuator according to the invention exploits the presence of the potentiometric or contactless transducer for indicating the position of the output shaft, in order to deduce the position of the rotor of the brushless synchronous motor, and thus makes it possible to reduce the number of sensors and therefore connections needed. Self-commutation of the brushless motor takes place no longer in response to information derived directly from the rotor of the motor but in response to indirect position information at the output of the application.

In its most general form, the invention relates to an electric actuator composed of at least one self-commutated brushless synchronous motor with P phases, where P is an integral number between 1 and 6, and N pairs of poles on the rotor, where N is an integral number greater than or equal to 1, the actuator containing a position transducer whose output signal controls an electronic circuit for operating the motor, the rotor of the said motor driving a speed-reducing mechanism of ratio R, characterized in that the said absolute position transducer is coupled [not to the rotor but] to the output shaft of the reducing gear in order to measure the absolute angular position of the output shaft of the reducing gear, the electronic circuit being provided with a circuit for sequential operation of the current of each of the phases, thus achieving automatic switching of the sequences of supply of the phases as a function of the absolute position of the output shaft of the reducing gear.

By absolute position transducer there is understood a position transducer provided with reference means to ensure an invariable reference position and the delivery of information that never takes the same value twice over the travel, in contrast to an incremental transducer. The transducer used by the invention is a transducer that delivers a signal corresponding to an injective function of the angular position; in other words, every value of the output signal of the transducer is the image of at most one value of angular position over the travel of the output shaft of the reducing gear.

This reference means may be composed of a means for restoring the output shaft in order to ensure compensation for the play.

It may also be composed of a reducing mechanism having play smaller than the resolution r and of a transducer having a resolution $r \leq 180/(N.P.R)$, where:

N denotes the number of pairs of poles on the rotor
P denotes the number of phases of the rotor
R denotes the reduction ratio The transducer driven by the output shaft of the reducing gear delivers a signal corresponding to an injective function of the angular position of the said output shaft.

According to another version, the reference means is composed of an additional position transducer driven directly by the rotor of the motor. This additional position transducer delivers a signal for synchronization of the motor control circuit.

Advantageously, the said mechanical speed-reducing gear has a reduction ratio R greater than 2.

According to a particular version, the restoring means of the shaft is composed of a helical spring, one end of which is integral with the output shaft and the other end of which is integral with a fixed point.

According to another embodiment in which the use of a spring or a restoring means is obviated, the mechanical speed-reducing gear has a play of less than 180/(N.P.R).

Preferably the position transducer has a resolution r of less than 180/(N.P.R) degrees.

According to a particular version, the electronic circuit has one input for receiving the signal delivered by the absolute position transducer of the output shaft of the reducing gear, and P outputs that each deliver an operating signal from one of the P phases of the motor, with a phase difference of 360/P between two consecutive phases, N denoting the number of pairs of poles of the motor.

According to a particular mode of operation, the electronic circuit additionally has a recalibration input that receives a signal delivered by an additional position transducer driven directly by the rotor.

Advantageously the electronic circuit additionally has an input for receiving a reference signal corresponding to the desired angular position, the electronic circuit completing a first servo control loop acting on the intensity of the motor torque and a second self-commutation loop controlling the current states in the phases of the motor.

According to another version, the electronic unit for operating the phases is composed of a transistorized power stage operated by a logical control stage that imposes the supply sequence and the amplitude of the current of the P phases.

Preferably the logical control stage is composed of a microcontroller provided with at least P outputs of PWM type, thus permitting independent adjustment of the current of each of the P phases.

According to one practical mode of operation, when voltage is applied to the electronic unit for operating the phases, this unit undergoes a sequence of initialization relative to a reference position defined by the restoring spring.

The present invention will be better understood by reading the description of a non-limitative practical example, provided hereinafter with reference to the attached drawings.

DETAILED DESCRIPTION OF THE INVENTION

The invention described by way of example hereinafter is provided with a three-phase motor (100) with 5 pairs of poles, such as that illustrated in FIG. 1. In known manner it comprises a stator (25) having three stator openings excited by electric coils (19).

Rotor (22) has 5 pairs of poles and is provided with a set of thin magnets, which are alternately radially magnetized in opposite directions. It drives a toothed wheel (50), driving speed-reducing gear (200), which is composed of a gear train.

In the described example, output shaft (28) of the motorized reducing gear supports a throttle valve (27). A restoring spring (34) composed of a helical spring acts on output shaft (28). The travel of output shaft (28) is less than 360°.

Figure 6:
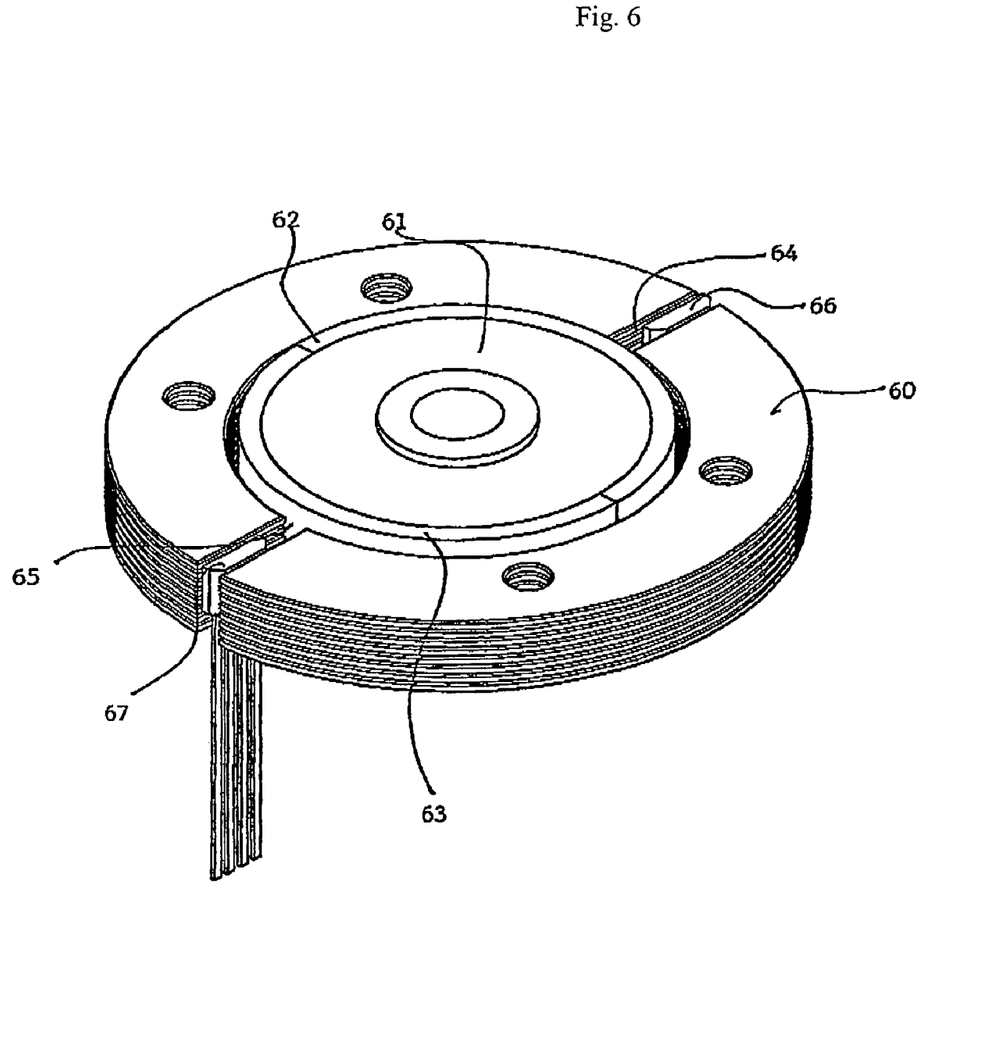
FIG. 6 illustrates a detailed view of the position transducer driven by the output shaft.

The output shaft directly drives a position transducer (24), illustrated in detail in FIG. 6. This position transducer is composed of a stator (60) and a rotor (61) containing two thin magnets (62, 63) of semi-tubular shape, magnetized radially in opposite directions. In the described example, stator (60) has two air gaps (64, 65), in which there are seated two Hall sensors (66, 67).

This transducer (24) delivers signals representative of the real angular position of output shaft (28) of the motorized reducing gear.

Figure 10:
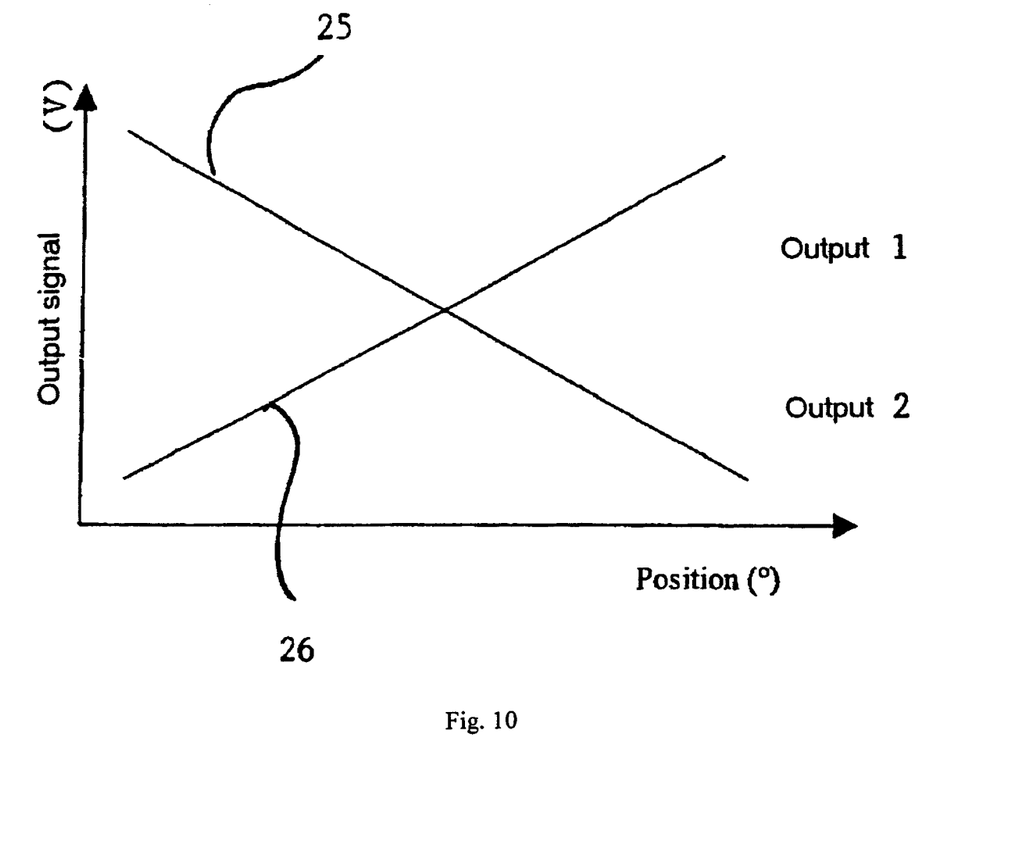
FIG. 10 illustrates the output signals of the position transducer.

The signal delivered by such an absolute position transducer is equivalent to that of a potentiometric transducer, and it is an analog signal composed of a voltage substantially proportional to the angular position, with a resolution of better than 0.1°. In the case of control of the air-admission valve for an injection engine, the absolute position transducer delivers 2 redundant signals (25, 26) (FIG. 10).

Control of motor (100) necessitates a change of state every 12° for a three-phase motor with 5 pairs of poles. This corresponds to a condition of change of state every 180/(N.P) degrees for self-commutation of a motor with P phases and N pairs of poles on the rotor.

In the actuator described in FIG. 5, transducer 24 delivers a signal that is an injective function of the angular position, of motor (100). Disregarding the play j of the reducing gear, an increment ($\theta-\theta_0$) of the position of the output shaft corresponds to an increment R ($\theta-\theta_0$) of the position of the rotor of the motor. To be able to ensure self-commutation with an actuator in conformity with the described example, it is necessary that a change of state take place for each 12° increment of the position of the rotor.

The resolution r necessary for the output potentiometer is therefore $0-0_0=12°/R=r$.

In the context of application for an air-admission throttle valve, the reduction ratio R is substantially equal to 20. The resolution r required of the transducer will therefore be 0.6°.

It is worth knowing that the usual resolutions of such transducers are on the order of 0.15°.

In general, for a motor with P phases and N pairs of poles on the rotor, the minimum resolution required of the transducer is $r \leq 180/(N.P.R)$, where:

N denotes the number of pairs of poles on the rotor
P denotes the number of phases of the rotor
R denotes the reduction ratio If the output shaft does not work against a restoring spring (34) such as described hereinabove, it is imperative that the play j of the reducing gear be smaller than 180/(N. P. R), to ensure that a rotor movement corresponding to the necessary minimum resolution condition results in a movement of the output shaft. Nevertheless, in most applications considered, we shall consider that the play j of the reducing gear is always corrected for by spring (34).

Figure 7:
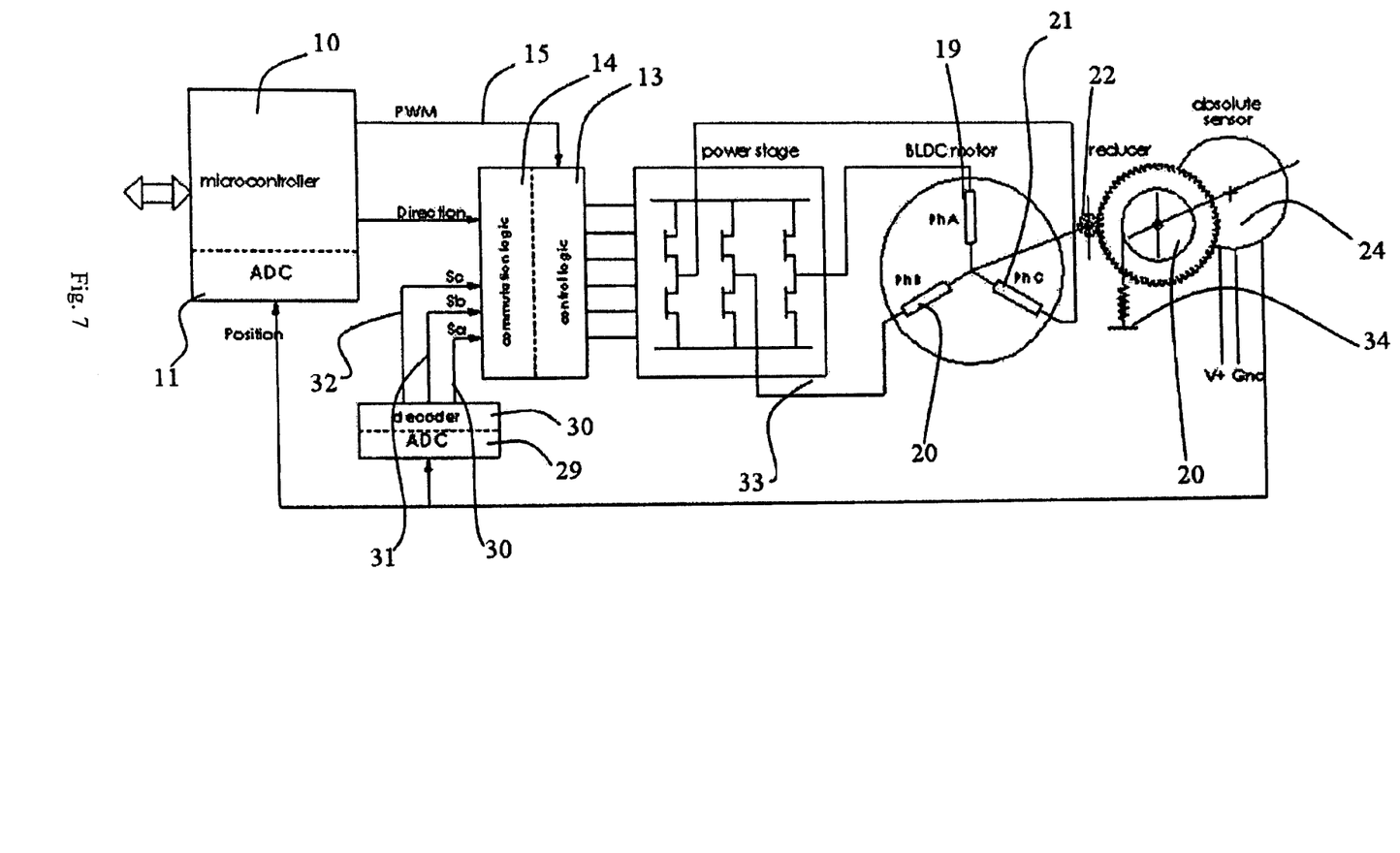
FIGS. 7 to 9 illustrate a view of the control circuit of an actuator according to the invention.

FIG. 7 shows a first version of the invention, where the output signal of transducer (24) is converted by means of analog-to-digital converter (29) into a digital signal. This digital signal is then processed by a decoder, the purpose of which is to deliver, via 3 channels SA, SB, SC (30), (31), (32), signals (4), (5), (6) equivalent to those of sensors (1), (2), (3) of FIGS. 1 and 2. The switching electronics delivers the rotor-position information to the control logic for self-commutation. This embodiment is obviously advantageous in that the three conductors for the sensors are no longer necessary and there is no need to output, toward the switching logic electronics, which is often not in close proximity, 3 sensor signals that are sensitive to electromagnetic perturbations.

Figure 8:
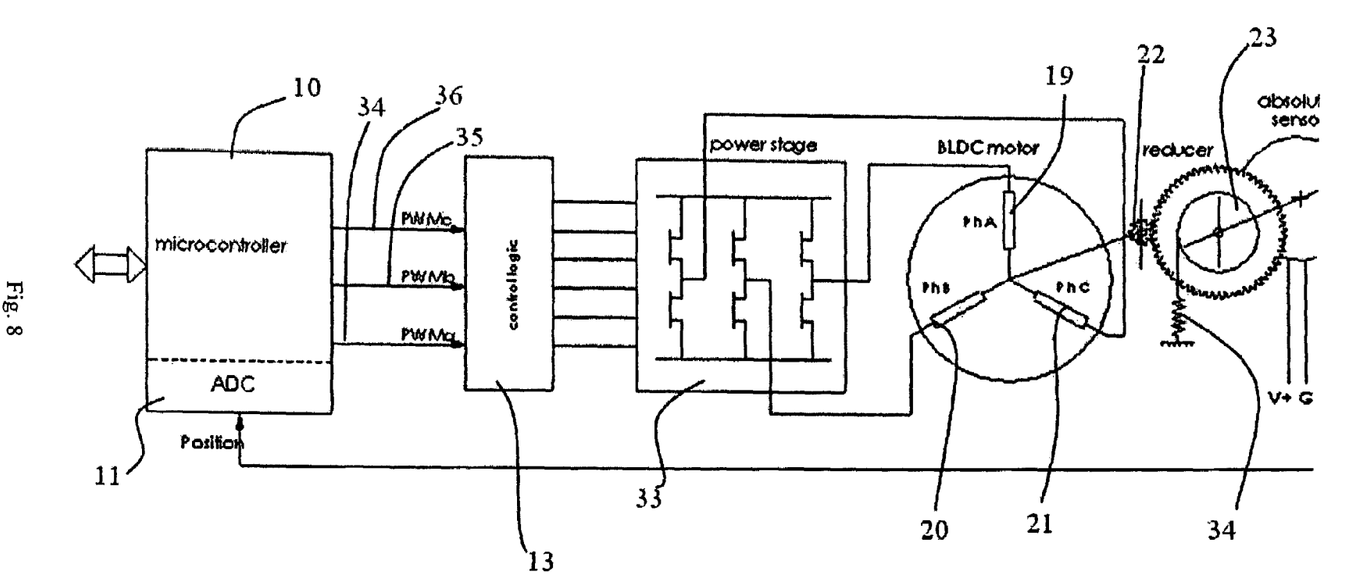

FIG. 8 shows a second and more powerful version of the invention, whose purpose is again to obviate the 3 Hall-effect sensors ((1), (2), (3)), but without having to recreate information identical to these 3 sensor signals.

Figure 11:
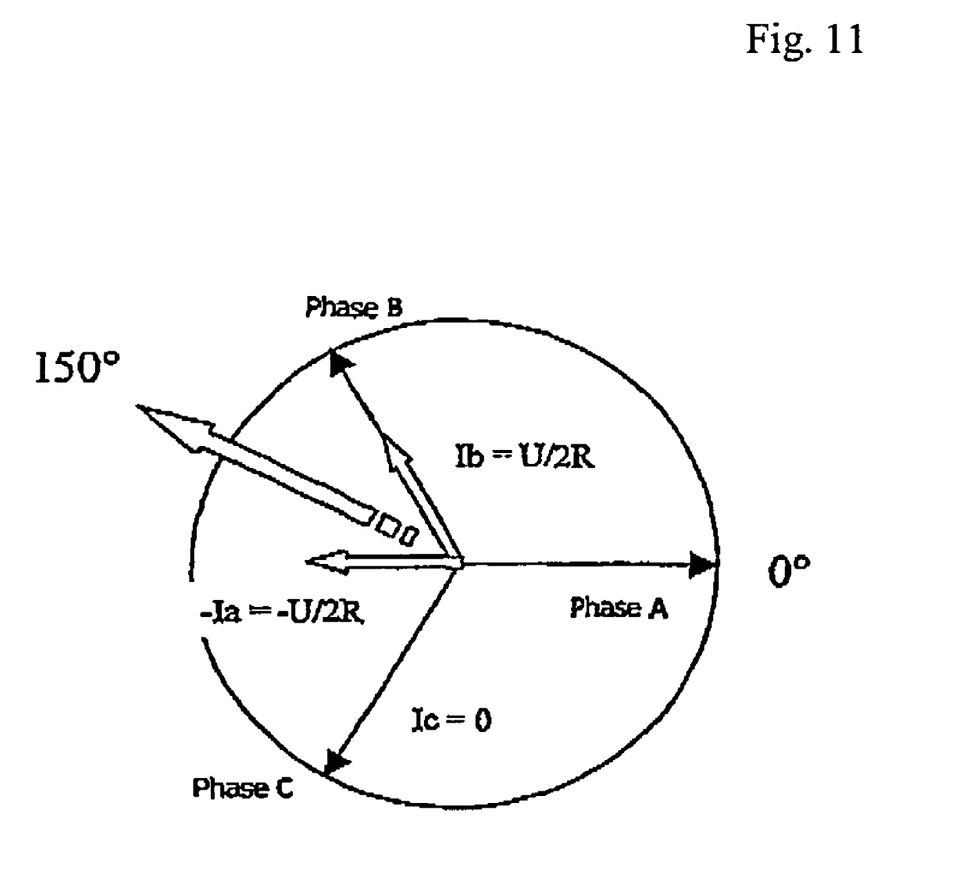
FIG. 11 illustrates a diagram of the electric vectors of an actuator according to the invention, for a specified position (in this case 150° according to the figure)

The analog signal of absolute transducer (24) is converted to digital information by the main analog-to-digital converter (11) of microcontroller (10), in the same way as in the usual servo control loop of FIGS. 5 and 7. This digital signal, however, will be used for the 2 servo control loops described hereinabove:

the traditional positioning servo control loop, which is identical to that of a d.c. motor, and the purpose of which is to create an effect on the intensity of the available motor torque and on its sign the self-commutation loop permitting the changeover from one current state in the P phases of the motor to the following state, with an adjustable phase lead as explained hereinafter with reference to FIG. 11.

Figure 9:
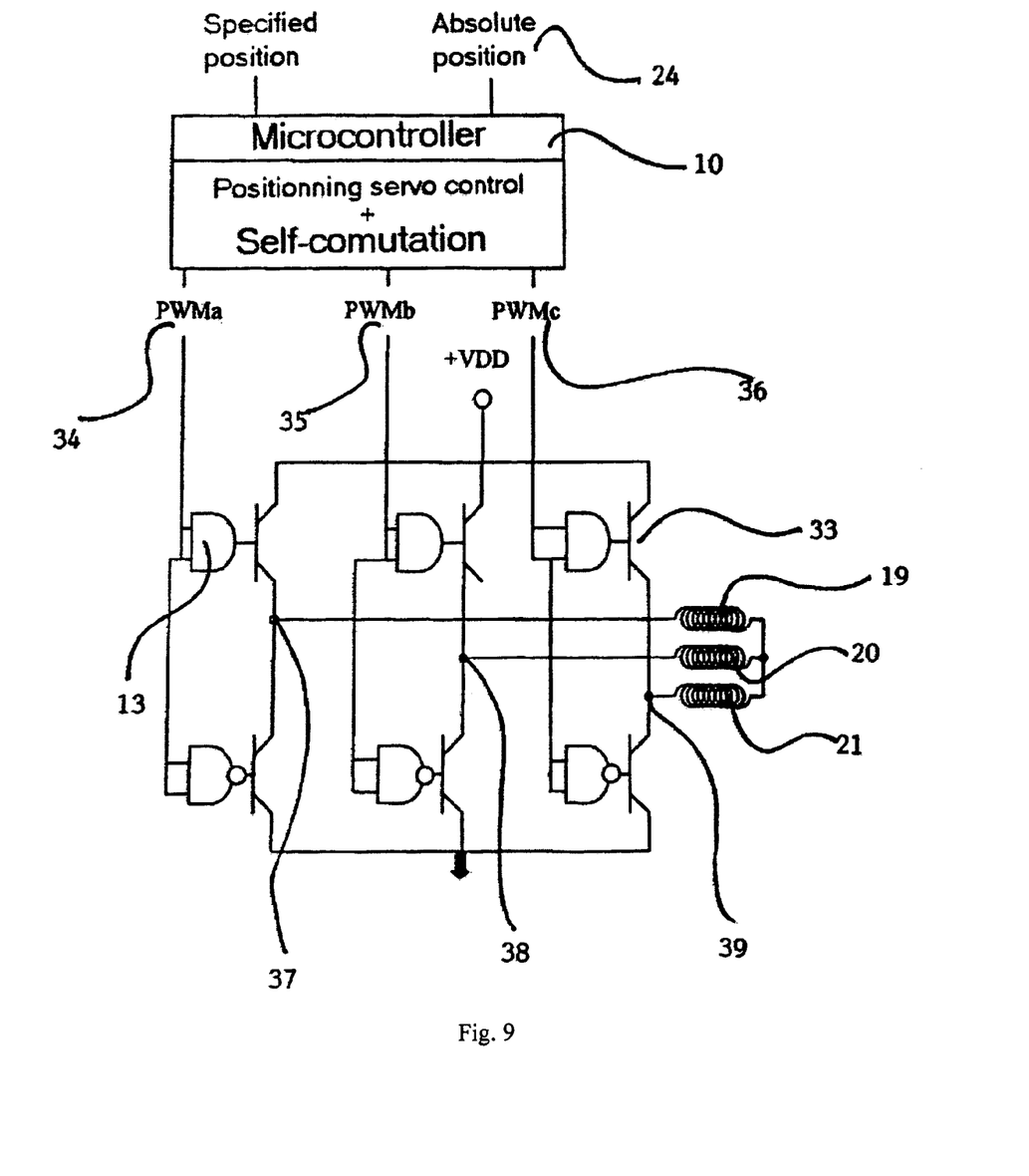

In contrast to the electronics described in FIGS. 7 and 8, the two loops are no longer physically separated but are processed by software by the microprocessor, as indicated in FIG. 9.

The result of these calculations of the 2 servo control loops leads to 2 adjustments:

the direction of rotation of the rotor is defined by the sequence of supply of the phases, and the current intensity in each of the phases is adjusted (positioning servo control mode).

The next current state in the phases is determined as a function of the rotor position, the phase difference between actual position and specified position being adjustable as a function of the speed of rotation of the rotor (self-commutation mode).

These 2 adjustments are achieved by using 3 PWM outputs of the microcontroller (PWMa (34), PWMb (35), PWMc (36)), which will modulate the operating factor of the power transistors (33). The layout of FIG. 9 describes a star-connected power supply with center tap for the three-phase motor. Each of the phases (19), (20), (21) is operated by a transistor half-bridge (33), which should make it possible to apply voltages of the following types at points (37), (38) and (39):

Ua=U cos N.R.θ(t) for phase A
Ub=U cos (N.R.θ(t)+120°) for phase B
Uc=U cos (N.R.θ(t)+240°) for phase C The angle θ(t) is the position sought for output shaft (28) of the application described in FIG. 5, composed of a three-phase motor with N pairs of poles, of a reducing gear of ratio R and of a potentiometer, when the 3 phases are supplied with voltages Ua, Ub, Uc. On the trigonometric circle of FIG. 11, there can be plotted the specified position N.R.θ(t) within an electrical period of 360° as a function of the currents Ia, Ib and Ic passing through each of the phases (19), (20), (21), the coupling constants of each phase being spaced apart by 120 electrical degrees.

It is seen on this trigonometric circle that, regardless of what position may be specified on this circle, the condition Ia+Ib+Ic relating to addition of currents in the case of a connection with center tap is nevertheless satisfied. The example of FIG. 11 for a three-phase motor describes a position of 150 electrical degrees relative to the origin of 0°; that is, a position of 1.5° on the output shaft relative to the reference position $\theta_0$ is obtained with Ic=0 and Ia=−Ib=U/2R, where U is the supply voltage of the application and R is the resistance of each winding.

It will therefore be possible to control the position θ(t) of the output shaft by the 3 signals PWMa, PWMb, PWMc by means of a double loop for self-commutation and positioning servo control.

In the foregoing we have seen the required conditions for the resolution r of the absolute transducer, and it is now necessary to determine the mode of initialization of the application described in FIG. 5. It is in fact very important that we be able, on the basis of this initialization sequence, to correlate the absolute position of the output axis given by the transducer signal with the absolute position of the rotor.

When voltage is applied to the application, the output shaft will be in reference position $\theta_0$, to which it is returned by the restoring spring, but we do not know the absolute position of the rotor. The initialization method then comprises establishing arbitrarily a sequence of supply of the phases such that:

Ua=U cos α(t) for phase A
Ub=U cos α(t)+120° for phase B
Uc=U cos α(t)+240° for phase C, with α=0 at t=0, in such a way as to cause the valve to open, and for a sequence having a value equal to α(t)=k.360'. At the end of this sequence, the position intended for the rotor is therefore, the position 0° indicated in FIG. 11. It is sufficient to record the position θ indicated by the absolute transducer and to take this value θ as the initial value for the new sequence.

The method of self-commutation of phases and positioning servo control explained here is valid for any type of polyphase synchronous motor having N pairs of poles on the rotor and P phases, associated with a reducing gear, a restoring spring and an absolute position transducer, or in other words for:

permanent-magnet motors
hybrid motors
variable-reluctance motors

Figure 12:
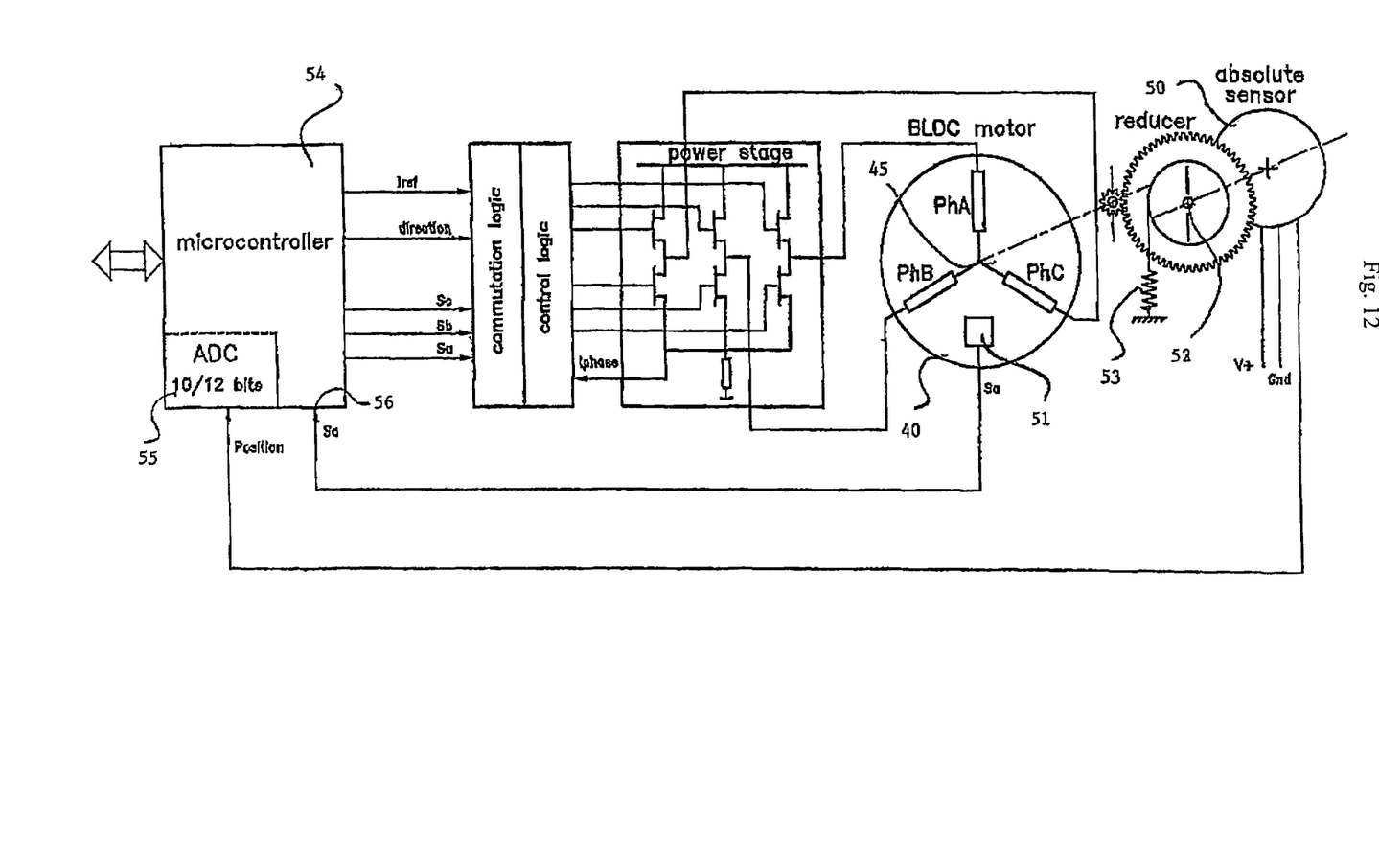
FIG. 12 illustrates a view of an alternative version of the control circuit, provided with an additional detection element (51) placed in the motor and delivering a digital synchronization signal that is a function of the direct position of the rotor.

FIG. 12 illustrates a view of a version of the control circuit, provided with an additional detection element (51) placed in the motor and delivering a digital synchronization signal that is a function of the direct position of the rotor. Motor (40) is provided with an additional transducer (51) driven directly by the rotor and delivering a reference signal in addition to the position signal delivered by the absolute position transducer (50) driven by the output shaft (52). The output shaft is acted on by a restoring spring (53), compensating for the play of the gear train.

Additional transducer (51) is composed of a Hall sensor that delivers a signal that is a function of the direct position of motor shaft (45). In the example of an actuator for a throttle valve, the motor shaft rotates through 5 revolutions for each 90° rotation of the output shaft of the reducing gear.

The output signal of the additional transducer (51) delivers a synchronization signal (56) to the microcontroller (54), permitting recalibration of the signal (55) delivered by the absolute position transducer (50). In the described example, synchronization takes place 10 times per revolution.

What is claimed is:

1. An electric actuator comprising:
at least one self-commutated brushless synchronous motor with P phases, where P is an integral number between 1 and 6, and N pairs of poles on a rotor of the motor, where N is an integral number greater than or equal to 1;
a position transducer outputting a signal that controls an electronic circuit configured to provide sequential operation of a current of each of the phases, the rotor of the motor driving a speed-reducing gear of ratio R, a travel of an output shaft of the speed-reducing gear being less than 360°,
wherein the position transducer is coupled to the output shaft of the speed-reducing gear to measure an absolute angular position of the output shaft of the speed-reducing gear, the electronic circuit ensuring automatic switching of sequences of supply of the phases of said at least one self-commutated brushless synchronous motor based on only the absolute angular position of the output shaft of the speed-reducing gear.

2. An electric actuator according to claim 1, further comprising a detection element, delivering a synchronization signal that is a function of a direct position of the rotor.

3. An electric actuator according to claim 1, wherein the transducer driven by the output shaft of the speed-reducing gear delivers a signal corresponding to an injective function of an angular position of the output shaft.

4. An electric actuator according to claim 1, wherein the speed-reducing gear is provided with restoring means for restoring the output shaft to a reference angular position.

5. An electric actuator according to claim 4, wherein the restoring means of the output shaft comprises a helical spring, a first end of the helical spring being integral with the output shaft and a second end being integral with a fixed point.

6. An electric actuator according to claim 1, wherein the speed-reducing gear has a play of less than 180/(N.P.R).

7. An electric actuator according to claim 1, wherein the position transducer has a resolution r of less than 180/(N.P.R) degrees.

8. An electric actuator according to claim 1, wherein the electronic circuit includes one input configured to receive the signal delivered by the position transducer of the output shaft of the speed-reducing gear, and P outputs that each deliver an operating signal to one of the P phases of the motor, with a phase difference of 360/P between two consecutive phases.

9. An electric actuator according to claim 8, wherein the electronic circuit further includes an input configured to receive a reference signal corresponding to a desired angular position, the electronic circuit completing a first servo control loop acting on an intensity of the motor torque and a second self-commutation loop controlling current states in the phases of the motor.

10. An electric actuator according to claim 1, wherein the electronic circuit operating the phases includes a transistorized power stage operated by a logical control stage that imposes the supply sequence and an amplitude of the current of the P phases.

11. An electric actuator according to claim 1, wherein the electronic circuit includes a microcontroller provided with at least P outputs of PWM type, permitting independent adjustment of the current of each of the P phases.

12. An electric actuator according to claim 1, wherein, when a voltage is applied, the electronic circuit operating the phases undergoes a sequence of initialization relative to a reference position defined by a restoring spring.

13. An electric actuator according to claim 1, wherein the speed-reducing gear has a reduction ratio R of greater than 2.

* * * * *